United States Patent Office 3,825,621
Patented July 23, 1974

3,825,621
METHOD OF GRAFT POLYMERIZATION AND POLYMERS PRODUCED THEREBY
Emory A. Ford, Hampden, Mass., assignor to Monsanto Company, St. Louis, Mo.
No Drawing. Filed Aug. 3, 1972, Ser. No. 277,758
Int. Cl. C08f 15/00
U.S. Cl. 260—878 R                10 Claims

ABSTRACT OF THE DISCLOSURE

A rubber modified polymer blend is prepared from a relatively small particle elastomer which is agglomerated to a particle size of about 0.2 to 1.0 micron by admixture with a more hydrophilic polymer at a pH of about 3.0 to 10.5. Following agglomeration, the latex is admixed with a vinylidene monomer formulation and grafting conditions are established to produce polymerization of the vinylidene formulation and grafting of at least a portion of the polymer being formed onto the agglomerated elastomer. The elastomer should have a glass transition temperature below 100° Centigrade and the agglomeration takes place at a temperature of 0° to 100° Centigrade and above the glass transition temperature of the elastomer.

BACKGROUND OF THE INVENTION

Graft polyblends formed by grafting various vinylidene polymers onto elastomeric substrates have been widely recognized as affording desirable toughness, chemical resistance and good formability by proper selection of the elastomer and graft superstrate. Such graft polymers have been utilized *per se* and at times have been blended with other polymers to produce so-called alloys. High impact polystyrene is generally formed by grafting a styrene monomer formulation onto a butadiene substrate, ABS is formed by grafting a styrene/acrylonitrile formulation onto an elastomer and MBS is formed by grafting a styrene/methylmethacrylate monomer formulation onto the elastomer. More recently, it has been proposed to graft such monomer formulations onto acrylate rubbers in order to obtain greater transparency, greater weathering properties, etc. It has also been proposed to graft monomer formulations high in nitrile content in order to achieve good weathering properties. Various other combinations of grafting monomer formulations and elastomeric substrates are to be found in the prior art.

In recent years there has been considerable activity with respect to optimization of the particle size of the elastomer onto which the monomer formulation is grafted. In Aubrey U.S. Pat. 3,509,237, granted Apr. 28, 1970, there is disclosed and claimed an ABS type poly-blend wherein there are graft copolymer particles of relatively small size and graft copolymer particles of relatively large size. In Dalton et al. U.S. Pat. 3,652,721 granted Mar. 28, 1972, there is disclosed an emulsion process for producing a bimodal ABS type polymer system in which an elastomer is initially agglomerated by means of an acid anhydride technique disclosed and claimed in Dalton U.S. Pats. 3,558,541 granted July 26, 1971 and 3,551,370 granted Dec. 29, 1970. Efforts to optimize the stability of the agglomerated latex in a subsequent grafting reaction are disclosed in Ford et al. U.S. Pat. 3,663,656 granted May 16, 1972.

Research activities have continued to optimize agglomerating techniques for various types of elastomers and to achieve stability in the agglomerated latex during the grafting reaction in order to obtain optimum polyblends. The Dalton agglomeration technique disclosed in the aforementioned patents affords particularly unique advantages from the standpoint of yielding an agglomerated latex having particles of substantially narrow size distribution, but preferably utilizes batch operation because of the necessity of avoiding excessive agitation during the agglomeration phase. Pressure or shear agglomeration techniques of the type disclosed in the ISRC British Pats. 976,212; 976,213; 976,214 and 1,039,727 offer the opportunity for continuous operation but result in broad particle size distribution. More recently, it was proposed by Wesslau et al. to utilize a hydrophilic polymer to achieve agglomeration of a hydrophobic elastomer in a latex process in *Investigations Into the Agglomeration of Polymer Latices*, Angewandte Makaromolekulare Chemie, 2, No. 20, Apr. 30, 1969, pp. 1–25.

It was felt that the Wesslau et al. technique of agglomeration might offer certain advantages for some applications in that the agglomerating agent is itself a polymer which could be utilized to modify the compositions produced from the agglomerated elastomer. However, it is imperative that the conditions of agglomeration, the agents selected and the conditions for the grafting reaction be properly coordinated so as to enable the production of graft copolymers exhibiting a useful balance of properties.

It is an object of the present invention to provide a novel process for producing graft polyblends wherein a small particle elastomer latex is initially agglomerated with a polymeric agent and thereafter the agglomerated latex is subjected to grafting with a vinylidene monomer formulation to produce a polyblend exhibiting a desirable balance of properties.

It is also an object to provide such a process which is readily adapted to saturated elastomers and which permits a wide variation in the composition of the grafting monomer formulation.

Another object is to provide such a process in which the agglomerated particles are relatively stable under the grafting conditions.

A further object is to provide novel polyblends with an agglomerated elastomeric substrate.

SUMMARY OF THE INVENTION

It has now been found that the foregoing and related objects may be readily obtained in a process wherein there is initially formed a homogeneous admixture of (1) a first latex containing about 20.0 to 60.0 weight percent of at least one substrate elastomer having a weight average particle size of less than about 0.2 micron and (2) a second latex containing about 1.0 to 40.0 weight percent of an agglomerating polymer in an amount sufficient to provide about 1.0 to 10.0 percent of the agglomerating polymer, based upon the weight of the substrate elastomer. The substrate elastomer should have a glass transition temperature below 100° Centigrade and exhibit a level of hydrophobicity greater than that of the agglomerating polymer.

The admixture is maintained at a temperature within the range 0° to 100° Centigrade and above the glass transition temperature of the substrate elastomer to produce agglomeration of the elastomer particles to a size of about 0.2 to 1.0 micron on a weight average basis. During this step, the agglomerating polymer should not have free carboxyl groups, and this may require adjustment of the pH to about 8.5 to 10.5 when the hydrophilic monomer of the polymer is a carboxyl compound.

The agglomerated latex is then admixed with a polymerizable vinylidene monomer formulation to produce a reaction mixture containing about 30–200 parts of polymerizable monomer formulation per 100 parts of elastomer, and this reaction mixture is subjected to polymerization conditions to cause at least a portion of the vinylidene polymer being formed to graft upon the agglomerated elastomer particles. Following the polymerization reaction, there is recovered from the reaction mixture a polyblend wherein the agglomerated elastomer particles are grafted with the vinylidene polymer.

Most desirably, the agglomerating polymer is an elastomer having a glass transition temperature below that at which the agglomeration step is effected, and a limited degree of cross linking has been found to be beneficial. The agglomerating polymer is conveniently an interpolymer containing 1.0 to 10.0 percent by weight of a carboxylic acid monomer component such as acrylic acid and methacrylic acid, and the remainder of the polymer may be provided by a $C_1$–$C_4$ ester of acrylic acid.

When the agglomerating polymer utilizes a carboxylic acid monomer component, the pH of the admixture with the elastomer latex is maintained at about 8.5 to 10.5 to effect agglomeration, and the agglomerated admixture is then adjusted subsequently to agglomeration to a pH below 8.5 for the grafting step. In accordance with the preferred aspect, the pH of the admixture is initially adjusted to the range of 8.5 to 10.5 by the addition of a volatile base, and thereafter the pH is adjusted downwardly by volatilizing the volatile base to remove it from the admixture.

In accordance with the preferred aspect, the substrate elastomer is selected from the group consisting of homopolymers and interpolymers of conjugated 1,3-dienes, homopolymers and interpolymers of $C_1$–$C_8$ acrylate esters, ethylene/propylene interpolymers, and mixtures thereof. The preferred monovinylidene monomer formulations are comprised at least principally of a monovinylidene aromatic hydrocarbon monomer and an ethylenically unsaturated nitrile monomer.

The resultant graft polyblends are comprised of:
(a) a matrix of a vinylidene polymer;
(b) a graft copolymer having an elastomeric substrate and a superstrate of the vinylidene polymer; and
(c) a polymer of relatively hydrophilic character.

The substrate of the graft copolymer has a weight average particle size of 0.2 to 1.0 micron, and the hydrophilic polymer is an interpolymer of a relatively hydrophobic monomer and a relatively hydrophilic monomer. The hydrophilic polymer is present in an amount of 0.5 to 15.0 percent by weight of the elastomeric substrate.

DETAILED DESCRIPTION OF THE PREFERRED EMBODIMENT

The process of the present invention requires an elastomeric polymer substrate which may subsequently be grafted by a vinylidene monomer formulation admixed therewith. It further requires a relatively hydrophilic polymer which will affect the stability of the latex of the elastomer polymer and produce controlled agglomeration thereof under conditions of operation. The particular emulsifier or stabilizing agent is not critical, and the conditions of operation will vary depending upon the specific components selected.

The theory of operation is not completely understood. Wesslau et al. have suggested that the hydrophilic groups in the agglomerating polymer orient themselves on the surface of that polymer to form a hydrate sheath which can interact with the elastomer particles so as to produce coalescence of a plurality of elastomer particles.

It is believed that the agglomerating polymer may subsequently disassociate itself from the surface of the agglomerated elastomer particles at the conditions of the grafting reaction, which will generally involve a change in pH from that in which agglomeration is effected, thus altering the nature of the agglomerating polymer at the time of grafting. During the grafting reaction, the agglomerated particles are grafted with the polymer being formed from the monomer formulation, and this tends to stabilize the agglomerated particles against further changes in morphology. Evidence indicates that the agglomerating polymer may assist the stabilization of the agglomerated elastomer particles during the initial phases of the grafting reaction even where alteration of the pH has taken place.

The Substrate Elastomer

Various rubbers onto which vinylidene monomers may be grafted during their polymerization in the presence thereof are utilizable as the substrate elastomer so long as they are relatively hydrophobic and have a glass transition temperature ($T_g$) of less than 100° Centigrade. Suitable elastomers include conjugated 1,3-diene rubbers, ethylene-propylene-diene terpolymer rubbers, acrylate homopolymer and interpolymer rubbers, and mixtures thereof. Although saturated rubbers such as polybutylacrylate and ethylene/propylene copolymer may be grafted, it has been found desirable to include at least a small amount (at least 1.0 percent by weight) of a diene monomer component such as butadiene-1,3 in order to facilitate grafting thereof. This diene monomer component will normally comprise 1 to 20 percent by weight and preferably 2 to 8 percent by weight of the ethylene/propylene/diene terpolymer or acrylate copolymer rubber.

The preferred elastomers are conjugated diene rubbers or mixtures of diene rubbers, i.e., any rubbery polymers (a polymer having a second order transition temperature not higher than —20° Centigrade, as determined by ASTM Test D–746–52T) of one or more conjugated 1,3-dienes, e.g., butadiene, isoprene, piperylene, chloroprene, etc. Such rubbers include homopolymers of conjugated 1,3-dienes and interpolymers of such 1,3-dienes with up to an equal amount by weight of one or more copolymerizable monoethylenically unsaturated monomers which are not highly hydrophilic, such as monovinylidene aromatic hydrocarbons (e.g., styrene; an aralkylstyrene, such as the o-, m-, and p-methylstyrenes, 2,4-dimethylstyrene, the ar-ethylstyrenes, p-tert-butylstyrene, etc.; and alpha-alkylstyrene, such as alphamethylstyrene, alpha-ethylstyrene, alpha-methyl-n-methylstyrene, etc.; vinyl naphthalene, etc.); ar-halo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; unsaturated ketones (e.g., vinyl methyl ketone, methyl isopropenyl ketone, etc.); alpha-olefins (e.g., ethylene, propylene, etc.); pyridines; vinyl and vinylidene halides (e.g., the vinyl and vinylidene chlorides and bromides, etc.); and the like.

Of generally equal interest are the elastomeric copolymers of acrylate esters and polyunsaturated relatively hydrophobic comonomers such as conjugated and non-conjugated dienes (butadiene, octadiene, etc.). Generally, the comonomer will comprise 1 to 10 percent by weight of the total polymer.

A preferred group of rubbers are those consisting essentially of 75 to 100 percent by weight of butadiene and/or isoprene and up to 25 percent by weight of a monomer selected from the group consisting of monovinylidene aromatic hydrocarbons (e.g., styrene) and unsaturated nitriles (e.g., acrylonitrile), methyl methacrylate, or mixtures thereof. Particularly advantageous substrates are butadiene homopolymer or an interpolymer of 90 to 95 percent by weight butadiene and 5 to 10 percent by weight of acrylonitrile or styrene.

The solids content of the latex of the substrate elastomer should be within the range of 20.0 to 60.0 and preferably 30.0 to 50.0 percent. As the solids content decreases, the degree of agglomeration will also decrease. However, a solids content in excess of 60.0 percent produces special problems in stability.

The particle size of the substrate elastomer should be on the order of 0.02 to 0.2 micron and preferably about 0.05 to 0.2 micron in order to achieve optimum particle sizes for grafting. The emulsifier employed is not particularly critical since the process of the present invention has been satisfactory with elastomer latices utilizing conventional soaps such as rubber reserve soap, synthetic emulsifiers such as ethylene oxide/octylphenol condensates and alkali metal salts of long chain sulfonic acids, etc. However, the elastomer latex should not contain an excess of emulsifying agent since the efficiency of agglomeration is generally decreased by increases in the amount of emulsifier. Accordingly, the ideal elastomer latices are those which contain emulsifier in an amount only slightly above that essential to maintain latex stability, which, of course, will depend upon the particular polymer, the solids content, and the particular emulsifier being employed.

The Agglomerating Polymer

The agglomerating polymer is one which exhibits a relatively high degree of hydrophilicity as compared to the relatively hydrophobic substrate elastomer. Accordingly, it will normally be an interpolymer formed from one or more relatively water soluble or hydrophilic monomers and one or more water insoluble or hydrophobic monomers. The hydrophilic monomers will generally be from the class consisting of $C_1$–$C_8$ carboxylic acids, amides, sulfonates and sulfates, with the carboxylic acids and amides being preferred. The hydrophobic monomers will generally be from the class consisting of dienes, $C_1$–$C_{10}$ carboxylic acid esters, $C_1$–$C_4$ olefins and monovinylidene aromatic hydrocarbons, with the preferred substances being those monomers which will yield elastomeric materials, i.e., the acrylate esters and dienes.

Exemplary of the hydrophilic monomers are acrylic acid, methacrylic acid, maleic anhydride, itaconic acid, crotonic acid, methacrylamide, ethacrylamide and N-butyl acrylamide. Exemplary of the hydrophobic monomers are methylacrylate, methyl methacrylate, ethyl acrylate, butyl acrylate, 2-ethylhexyl acrylate, octyl acrylate, styrene, vinyl acetate and butadiene.

The amount of the two different types of monomers in the polymer required to produce the desired hydrophilic character will vary with the particular monomer selected since a more hydrophobic comonomer will require either a more hydrophilic comonomer or a greater percentage of a given hydrophilic comonomer. The ratios of the specific comonomers selected from the two classes must be adjusted to avoid water solubility while at the same time providing the necessary degree of hydrophilicity. When $C_1$–$C_6$ acrylate esters are employed as the hydrophobic monomer, 1 to 25 and preferably 2 to 10 percent by weight of a hydrophilic carboxylic acid or carboxylic acid amide monomer will be sufficient to provide the desired hydrophilic copolymer. The following are specific examples of compositions which may be desirably employed:

90–98/10–2 ethyl acrylate/acrylic acid
95–85/5–15 butyl acrylate/acrylic acid
92–98/8–2 ethyl acrylate/methacrylic acid
55–65/15–25/10–30 butadiene/styrene/methacrylic acid As indicated hereinbefore, the preferred agglomerating polymers are elastomeric in character and should have a glass transition temperature less than that at which the agglomeration reaction is to take place. Some cross linking of the copolymer is generally beneficial and can conveniently be effected by the incorporation of 0.5 to 5.0 parts by weight of a cross linking agent such as divinyl benzene. The particle size of the agglomerating polymer has not been found to be particularly significant although it is preferably on the order of 0.02 to 0.2 micron.

The Agglomerating Reaction

Several factors must be considered in admixing the agglomerating polymer with the substrate elastomer to produce the desired agglomeration of the substrate elastomer including the relative amounts, the pH, the temperature and the manner of admixture.

The agglomerating polymer is normally added in an amount of 0.5 to 15.0 percent based upon the weight of the substrate elastomer, and preferably 1.0 to 10.0 percent. With the preferred agglomerating polymers, the optimum amount will be 2.0 to 5.0 percent. The solids concentration of the latex of the agglomerating polymer is desirably 1.0 to 40.0 percent and preferably 5.0 to 15.0 percent. The amount of the latex of the polymer will vary, of course, with the solids content to provide the desired amount of agglomerating polymer based upon the solids content of the latex of the substrate elastomer.

Depending upon the particular substrate elastomer latex and the particular agglomerating polymer, the pH of the admixture may require adjustment. There should be no free carboxyl groups in the agglomerating polymer in order to obtain agglomeration when the hydrophilic monomer of the polymer is a carboxylic acid compound. Accordingly, the pH for use of such hydrophilic polymers should be adjusted to the range of about 8.0 to 10.5, preferably by use of ammonia gas, ammonium hydroxide or other relatively volatile bases. When an acrylamide is employed, the pH may be acid or basic since there are no free carboxylic groups; the pH may vary from 3.0 to 10.5.

The admixture of the substrate elastomer latex and the agglomerating polymer latex should be maintained at a temperature of 0° to 100° Centigrade and above the glass transition temperature of the substrate elastomer and preferably of the agglomerating polymer. Generally, the preferred temperatures are on the order of 20° to 50° Centigrade. At above 100° Centigrade, it will be appreciated that water will be driven off unless pressure is employed; conversely, below 0° Centigrade, the latex will tend to freeze.

The conditions of mixing should be controlled so as to ensure homogeneity in the admixture, but excessive shear should be avoided. Accordingly, paddle type agitation and other forms of agitation which will provide thorough admixing of relatively viscous latices are desirable, but high intensity agitation devices should not be employed.

The agglomerating reaction takes place almost instantaneously following admixture of the agglomerating polymer latex and the substrate elastomer latex. Generally, the time period employed will be within the range of one minute to one hour, although the admixture may be allowed to stand for far longer periods without any significant detrimental effect. Since the agglomeration will proceed with a high level of completion in a relatively short period of time, periods of 2 to 30 minutes and desirably 3 to 5 minutes will be employed for commercial operation, particularly if continuous operation is contemplated.

By selection of the conditions of operation, the agglomerating polymer and the ratios of the two polymers, variations in agglomerated particle size can be readily attained. The substrates for the grafting reaction will have a weight average particle size on the order of 0.2 to 1.0 micron and preferably 0.45 to 0.80 micron. The particle size is preferably determined by the technique of Chamot et al., *Handbook of Chemical Microscopy*, 2nd ed. (1946) (Wiley) pp. 414–420.

As will be readily appreciated, substrate elastomers of differing particle size will generally result from the agglomerating reaction since 100 percent efficiency cannot normally be obtained. Thus, some (on the order of 10 percent) elastomer of the original particle size will remain in addition to a large concentration of agglomerated elastomer particles, with some distribution in between these two points. The process of the present invention lends itself to provide bimodal systems of the type referred to in the aforementioned Aubrey patent by simple variations. For example, subsequent to the agglomeration reaction, the pH of the admixture may be reduced when a carboxylic acid monomer provides the hydrophilic character; then a further quantity of the unagglomerated substrate elastomer latex may be added which will retain essentially its particle size. Alternatively, a latex of a second elastomer may be admixed with the first elastomer latex and with the agglomerating polymer, the glass transition temperature or chemical composition of the second elastomer being such that the agglomerating agent will have a lesser effect thereon so as to produce a smaller particle size. Crosslinking of the substrate elastomer latices will also affect the ultimate particle size.

The Grafting Reaction

Generally, the grafting reaction will follow conventional emulsion grafting procedures and the dispersing agents or emulsifiers used for the preparation of the original elastomer latex will normally be sufficient for maintaining the stability of the latex during the grafting procedure. However, if so desired, additional emulsifier may be added prior to grafting.

As will be appreciated, the pH of the agglomerated latex may require adjustment to that necessary for the grafting reaction. The desired pH will depend upon the monomer in the vinylidene formulation and the initiators to be employed. For example, in grafting of styrene/acrylonitrile monomer mixture, the pH will preferably be on the order of 4.5 to 8.0; for styrene/methyl methacrylate mixtures the pH will preferably be on the order of 5.0 to 8.0; for methyl methacrylate mixtures the pH will preferably be on the order of 4.5 to 7.5, etc. When the pH has been adjusted to the basic side by the addition of ammonia or some other volatile base and adjustment towards the neutral or acid side is desired, this is most desirably effected by driving off the volatile constituent of the base such as by heating, agitation, flashing or nitrogen purge. In this manner, introduction of unnecessary and oftentimes undesirable ions can be avoided. Conversely, if the agglomeration has been conducted at a more acid pH, neutralization is desirably effected by use of ammonia or ammonium hydroxide to minimize the amount of ions being introduced.

The graft copolymer is prepared by polymerizing the monomer formulation in the presence of the preformed agglomerated elastomer substrate, generally in accordance with conventional graft polymerization techniques. In graft polymerization, the preformed elastomer substrate generally is admixed with the monomer and this admixture is polymerized to combine chemically or graft at least a portion of the polymer upon the substrate elastomer. Depending upon the ratio of monomer to substrate elastomer and polymerization conditions, it is possible to produce both the desired degree of grafting of the polymer onto the substrate elastomer and the polymerization of ungrafted polymer to provide the desired amount of matrix polymer at the same time. Normally, the ratio of monomers to elastomer charged to the graft polymerization reaction is the primary determinant of the superstrate:substrate ratio of the resultant graft copolymer. However, conditions of polymerization, elastomer chemistry and particle size, rates of monomer addition, chain transfer agents, etc. also exert an effect.

The initiator or catalyst is generally included within the range of 0.01 to 2.0 percent by weight, and preferably on the order of 0.1 to 1.0 percent by weight of the polymerizable monomer, depending upon the monomers and the desired polymerization cycle. As will be discussed more fully hereinafter, the initiator may be added incrementally to facilitate optimum grafting.

The grafting reaction may be controlled to produce a desired molecular weight for the polymer being formed. Such control may be accomplished by temperature control alone during the grafting reaction; however, it is generally desirable to incorporate a conventional molecular weight regulator such as the mercaptans, halides and terpenes (e.g., n-dodecylmercaptan, tert-dodecyl mercaptan, terpinolene) in relatively small percentages by weight. Normally, the combined effects of such regulators and temperature will be relied upon for molecular weight control.

The grafting reaction may also be controlled to vary the amount of grafting of the polymer being formed onto the substrate elastomer. Generally, this is effected by adding the monomer formulation either continuously or incrementally over the polymerization cycle and preferably by also adding the initiator continuously or incrementally over a significant portion of the polymerization cycle.

The monomer formulation is emulsified in the latex of the agglomerated elastomer. Additional water or emulsifying agent may be added if desired.

The monomer formulation is emulsified in the latex of the agglomerated elastomer. Additional water or emulsifying agent may be added if desired.

The polymerizable vinylidene monomer formulation will, of course, contain the monomers to be polymerized, initiator where required, and other desirable components such as stabilizers, molecular weight regulators, etc. Although the specific monomers will vary with the desired product and the composition of the polymerizable formulation may vary widely, the process is highly advantageously employed in the manufacture of styrene/acrylonitrile type polyblends, styrene/methyl methacrylate type polyblends, methyl methacrylate polyblends, styrene polyblends and high nitrile polyblends (AN/S or MAN/S). The substrate elastomer may also vary.

Exemplary of the monovinylidene aromatic monomers that may be interpolymerized are styrene; alpha-alkyl monovinylidene monoaromatic compounds, e.g., alpha-methylstyrene, alpha-ethylstyrene, alpha-methylvinyltoluene, alpha-methyl dialkylstyrene, etc.; ring-substituted alkyl styrene, e.g., vinyl toluene, o-ethylstyrene, p-ethylstyrene, 2-4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halosubstituted styrenes, e.g., 2-chloro-4-methylstyrene, 2,6-dichloro-3-methylstyrene, etc.; vinyl naphthalene; vinyl anthracene, etc. The alkyl substituents generally have one to four carbon atoms and may include isopropyl and isobutyl groups. If so desired, mixtures of such monovinylidene aromatic monomers may be employed.

Exemplary of the ethylenically unsaturated nitriles that may be employed are acrylonitrile, methacrylonitrile, ethacrylonitrile and mixtures thereof. Exemplary of the acrylic monomers that may be employed are methyl methacrylate, ethyl acrylate, acrylic acid, methacrylic acid, butyl acrylate, etc.

Other monomers that may be included in the vinylidene monomer formulations are the conjugated 1,3-dienes, e.g. butadiene, isoprene, etc.; acrylamide, methacrylamide; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of various of the foregoing materials useful as comonomers in an interpolymer will vary.

The preferred vinylidene monomer formulations of the present invention consist at least principally of a monovinylidene aromatic hydrocarbon and an ethylenically unsaturated nitrile, i.e., such monomers comprise at least 50.0 percent by weight and preferably at least 75.0 percent by weight of the formulation. Most desirably, such monomers comprise at least 90.0 percent by weight of the formulation and the usual commercial compositions are substantially completely comprised of such monomers although minor amounts, i.e., less than 5.0 percent by weight, of other components such as chain transfer agents, modifiers, etc. may be included. These preferred polymerizable monomer mixtures contain at least 10 percent by weight of the monovinylidene aromatic hydrocarbon monomer and preferably at least 50 percent by weight thereof if an ABS type polymer is sought. They also contain at least 5 percent by weight of the unsaturated nitrile and preferably at least 10 percent by weight thereof. From the standpoint of highly advantageous commercial practice to produce advantageous ABS products, the monomer formulations contain 20 to 95 percent, and preferably 60 to 85 percent, by weight of the monovinylidene aromatic hydrocarbon and 80 to 5 percent, and preferably 40 to 15 percent, by weight of the unsaturated nitrile. If a polymer having excellent barrier properties is desired, the nitrile content is preferably at least 70 percent by weight thereof.

Various water-soluble free radical polymerization initiators are conventionally used for emulsion polymerization of the elastomer monomers, including conventional peroxy and azo catalysts, and the resultant latex containing residual initiator may be used as the aqueous medium with which the vinylidene monomer formulation is admixed. In this manner, the initiator for the elastomer polymerization may function in whole or in part as the initiator for the graft polymerization. However, additional initiator may be added at the time of graft polymerization either as a single charge or on a continuous or an incremental basis. Exemplary of suitable peroxy catalysts are the alkali metal peroxides, persulfates, perborates, peracetates and percarbonates, and hydrogen peroxide; and if so desired the initiator may be activated to form a redox system. In addition, it may be advantageous to include an oil-soluble initiator such as di-tert-butyl peroxide, benzoyl peroxide, lauroyl peroxide, oleyl peroxide, toluyl peroxide, di-tert-butyl-diperphthalate, tert-butyl peracetate, tert-butyl perbenzoate, dicumyl peroxide, tert-butyl peroxide, isopropyl peroxy dicarbonate, 2,5-dimethyl-2,5-di(tert-butylperoxy)hexane, 2,5 - dimethyl-2,5-di-(tert-butyl peroxy)-hexane-3, tert-butyl hydroperoxide, cumene hydroperoxide, p-methane hydroperoxide, cyclopentane hydroperoxide, diisopropylbenzene hydroperoxide, p-tert-butylcumene hydroperoxide, pinane hydroperoxide, 2,5-dimethyl-hexane-2,5-dihydroperoxide, etc., or a mixture thereof. Moreover, other means of free-radical catalysis may be employed, such as actinic radiation.

The latex of the agglomerated elastomer and the monomer formulation is polymerized in an inert atmosphere at temperatures in the range of 20–100° Centigrade with agitation, and pressures of 0–100 p.s.i.g. may be employed. Polymerization is continued until substantially all, i.e., more than 90 percent, of the monomers have been polymerized, and the cycle will normally range from 2–10 hours and preferably 4–8 hours. Thereafter, the remaining monomer formulation and other volatile components are generally distilled from the latex, which is dewatered, washed and dried. The latex may be dewatered by spray drying, by coagulation through the addition of salts, or by other means.

The total amount of monomer formulation to be added will normally amount to 30–200 parts monomer per 100 parts total elastomer, and preferably about 75–150 parts per 100 parts total elastomer. The actual amount of monomer formulation added will be dependent upon the grafting efficiency of the reaction and the desired superstrate to substrate ratio for the graft copolymer formed. Although the entire amount of the monomer formulation may be present at the time that polymerization is commenced, generally it is preferable to add the monomer formulation either continuously or in increments over the major portion of the polymerization cycle. For example, the monomer formulation may be added over approximately ⅓–⅝ of the total polymerization cycle, and although this addition may take the form of increments of varying size, the preferred technique utilizes substantially continuous addition at a relatively constant rate over ½–¾ of the cycle. Normally, additional initiator is added incrementally or continuously over that portion of the cycle during which the monomer formulation is being added.

The Polymer Blend

As will be readily appreciated, the rubber content of the polymer blend produced by the graft polymerization process of the present invention may be in excess of that desired for the final product since economics generally dictate the use of high elastomer levels in the graft polymerization reaction. Accordingly, the graft polymerization blend resulting from the graft polymerization reaction will normally be blended with a vinylidene polymer of similar composition to increase the amount of matrix polymer and reduce the elastomer level. This resinous polymer used for dilution of the graft copolymer may be produced by an emulsion process so that the latex thereof may be combined with the latex from an emulsion graft polymerization process and the mixed latex co-coagulated. Alternatively, the recovered graft copolymer may be admixed with a separately formed resinous polymer produced by emulsion, suspension or mass polymerization techniques. Generally, the final polymer blends will contain 2–50 percent by weight of the elastomer component. The preferred blends contain about 7–35 percent by weight of the graft copolymer based upon elastomer, and most desirably about 13–25 percent by weight thereof.

Example One

To a stirred reactor are charged 15 parts of a one percent solution of potassium persulfate, 20 parts of a 10 percent solution of sodium lauryl sulfate, 190 parts of distilled water, 150 parts n-butyl acrylate and 0.13 part ethylene glycol dimethacrylate. The admixture is cooled to 5° Centigrade after which are added 4.5 parts distilled butadiene 1,3 and .8 parts of a one percent solution of sodium metabisulfite. The resultant reaction mixture is agitated at 55° Centigrade for 18 hours and the resultant latex is found to have a 40 percent solids content and exhibit in excess of 90 percent conversion of monomers to polymer. The particle size on a weight average basis is observed to be about 0.1 micron.

A latex of an aglomerating agent is separately prepared by emulsion polymerization of 95 parts ethyl acrylate and 5 parts acrylic acid using 0.5 part of potassium persulfate as the initiator and 0.5 part of sodium lauryl sulfate as the emulsifier in 250 parts water. The resultant solids content is found to be 40 percent and is diluted to provide a 10 percent solids content.

Two parts of ethyl acrylate/acrylic acid latext is added with stirring to 100 parts of the butyl acrylate/butadiene elastomer latex. This combined latex is mixed slowly for a period of 30 minutes and maintained at 40° Centigrade with the pH being adjusted to 9.0 by the addition of ammonium hydroxide. The weight average particle size following agglomerations is observed to be 0.5 micron.

To a reactor is charged the agglomerated latex and additional water is added to provide a solids content of approximately 20 percent. This latex is heated to 60° Centigrade after nitrogen purge and adjustment of the pH to 5.0. A monomer formulation is prepared comprising 300 parts of 75/25 styrene/acrylonitrile mixture, 2 parts tertiary dodecyl mercaptan and 3 parts di-isopropybenzene hydroperoxide. Ten percent of the monomers per se is added initially after purging with nitrogen and the mixture is stirred for 15 minutes following which there is added a charge consisting of 3 parts of a 0.2 percent solution of ferrous sulfate, 0.9 part of a 10 percent solution of sodium formaldehyde sulfoxylate and 3 parts of a 0.25 percent solution of ethylene diamine tetraacetic acid. The remaining monomer formulation is added continuously over a 6 hour period. The reaction mixture is maintained at temperature for one hour after monomer addition is completed, and the polymer is recovered by addition of a 2 percent solution of magnesium sulfate. The resultant crumb is washed with water and dried.

Conversion is found to be over 90.0% and tests indicate the elastomer substrate to be grafted. Physical tests indicate good impact properties including Izod impact and falling dart impact. Tensile properties and gloss are found to be highly satisfactory.

Example Two

An elastomer of homopolybutadiene is prepared in a latex containing 35 percent solids utilizing rubber reserve soap as the emulsifying agent. A latex of an agglomerating polymer is prepared utilizing as the monomer formulation a 60/20/20 butadiene/styrene/methacrylic acid mixture. The interpolymer is diluted to a 10 percent solids content.

Upon examination, the homopolybutadiene latex is found to have a weight average particle size of 0.136 micron. Following admixture for a period of 20 minutes with 5 parts of the agglomerating polymer based upon 100 parts of butadiene homopolymer and at a pH of 9.0 and a temperature of 30° Centigrade, the particles of butadiene homopolymer are found to have a weight average particle size of 0.5 micron.

The agglomerated elastomer is then grafted in emulsion at a pH of 5.5 with a sytrene/methyl methacrylate mixture (70/30). The resultant polyblend is found to exhibit a desirable balance of properties including impact strength, tensile strength and gloss.

Thus it can be seen from the foregoing detailed specification and examples that the present invention provides a novel and beneficial method for producing graft polyblends wherein a small particle elastomer latex is initially agglomerated with a polymeric agent and the agglomerated latex is thereafter grafted with a vinylidene monomer formulation to produce a polyblend exhibiting a desirable balance of properties. The agglomerating polymer remains in the agglomerated latex and appears to provide grafting stability and contribute to the properties of the final polyblend.

What is claimed is:

1. In a process for the production of a graft polyblend, the steps comprising:
   (a) forming a homogenous admixture of (1) a first latex containing about 20.0 to 60.0 weight percent of at least one substrate elastomer, selected from the group consisting of conjugated 1,3-diene polymer rubbers, acrylate, polymer rubbers, ethylene/propylene rubbers and mixtures thereof, and having a weight average particle size of less than about 0.2 micron and (2) a second latex containing about 1.0 to 40.0 weight percent of an agglomerating polymer, which is an interpolymer of one or more hydrophilic carboxylic monomers and one or more hydrophobic monomers selected from the group consisting of carboxylic acid esters, $C_1$–$C_4$-olefins, dienes and monovinylidene aromatic hydrocarbons, in an amount sufficient to provide about 0.5 to 15.0 percent of said agglomerating polymer based upon the weight of said substrate elastomer present in said admixture, said substrate elastomer having a glass transition temperature below 100° Centigrade and exhibiting a higher level of hydrophobicity than said agglomerating polymer;
   (b) maintaining said admixture at a temperature within the range of 0°–100° Centigrade and above said glass with said agglomerating polymer having no free carboxyl groups to produce agglomeration of elastomer particles to a size of about 0.2 to 1.0 micron on a weight average basis;
   (c) thereafter admixing with said agglomerated admixture a polymerizable vinylidene monomer formulation comprising monomers selected from the group consisting of monovinylidene aromatic monomers, ethylenically unsaturated nitriles, acrylic monomers, mixtures thereof, and mixtures thereof with other copolymerizable mono- and diethylenically unsaturated monomers to produce a reaction mixture containing about 30.0 to 200.0 parts of polymerizable monomer formulation per 100.0 parts of elastomer present therein;
   (d) subjecting said reaction mixture to polymerization conditions to cause at least a portion of the vinylidene polymer being formed to graft upon said agglomerated elastomer particles; and
   (e) recovering from said reaction mixture a polyblend wherein the agglomerated elastomer particles are grafted with said vinylidene polymer.

2. The process in accordance with Claim 1 wherein said agglomerating polymer is an elastomer having a glass transition temperature below that at which the agglomeration step is conducted.

3. The process in accordance with Claim 1 wherein said agglomerating polymer is an interpolymer containing 1.0 to 10.0 percent by weight of a carboxylic acid monomer component, wherein the pH of the admixture is maintained at about 8.5 to 10.5 and wherein the admixture is adjusted subsequent to agglomeration to a pH below 8.5 for said grafting step.

4. The method in accordance with Claim 3 wherein the pH of the admixture is initially adjusted by addition of a volatile base and wherein the pH of the admixture is adjusted downwardly by volatilizing said volatile base.

5. The method of Claim 3 wherein said substrate elastomer is selected from the group consisting of homopolymers and interpolymers of conjugated 1,3-dienes, homopolymers and interpolymers of $C_1$–$C_8$ acrylate esters, ethylene/propylene interpolymers, and mixtures thereof.

6. The process in accordance with Claim 1 wherein said agglomerating elastomer is an interpolymer of a $C_1$–$C_4$ ester of acrylic acid and methacrylic acid.

7. The process in accordance with Claim 1 wherein said vinylidene monomer formulation is comprised at least principally of a monovinylidene aromatic hydrocarbon monomer and an ethylenically unsaturated nitrile monomer.

8. The process in accordance with Claim 1 wherein said agglomerating elastomer is cross linked.

9. A graft polyblend comprising:
   (a) a matrix of a vinylidene polymer, comprising the polymerization product of monomers selected from the group consisting of monovinylidene aromatic monomers, ethylenically unsaturated nitriles, acrylic monomers, mixtures thereof, and mixtures thereof with other copolymerizable mono- and diethylenically unsaturated monomers;
   (b) a graft copolymer having an elastomeric substrate selected from the group consisting of conjugated 1,3-diene polymer rubbers, acrylate, polymer rubbers and mixtures thereof, and a superstrate of said vinylidene polymer, said substrate having a weight average particle size of 0.2 to 1.0 micron; and
   (c) a polymer of relatively hydrophilic character, said polymer being an interpolymer of a relatively hydrophobic monomer selected from the group consisting of carboxylic acid esters, $C_1$–$C_4$ olefins, dienes and monovinylidene aromatic hydrocarbons and a relatively hydrophilic carboxylic monomer, said polymer being present in an amount of 0.5 to 15.0 percent by weight of said elastomeric substrate.

10. The graft polyblend in accordance with Claim 9 wherein said interpolymer contains 1.0–10.0 percent by weight of a carboxylic acid monomer component as the hydrophilic monomer and wherein said interpolymer has a glass transition temperature below about 20° Centigrade, and wherein said vinylidene polymer is comprised at least principally of a monovinylidene aromatic hydrocarbon monomer and an ethylenically unsaturated nitrile monomer.

References Cited

UNITED STATES PATENTS 3,663,656    5/1972    Ford et al. _____ 260—878 R

OTHER REFERENCES

*Chemical Abstracts 69: 10773t* (1968).

JOSEPH L. SCHOFER, Primary Examiner

A. HOLLER, Assistant Examiner

U.S. Cl. X.R.

260—879, 880 R, 881, 883, 885, 886

UNITED STATES PATENT OFFICE
CERTIFICATE OF CORRECTION

Patent No. 3,825,621            Dated July 23, 1974

Inventor(s)     Emory A. Ford

It is certified that error appears in the above-identified patent and that said Letters Patent are hereby corrected as shown below:

Column 2, line 12, "Makaromolekulare" should read --Makromolekulare--.

Column 11, line 35 and Column 12, line 41, cancel the comma after "acrylate".

Column 11, line 53, insert after "glass" --transition temperature of said substrate elastomer--.

Signed and sealed this 8th day of October 1974.

(SEAL)
Attest:

McCOY M. GIBSON JR.           C. MARSHALL DANN
Attesting Officer              Commissioner of Patents